2,772,261

FUNGICIDAL COMPOSITION

Charles C. Yeager, Glen Ellyn, Ill., assignor to Scientific Oil Compounding Company, Inc., a corporation of Illinois No Drawing. Application August 26, 1954,
Serial No. 452,448

24 Claims. (Cl. 260—102)

This invention relates to novel reaction products of a complex metal ammine salt of a rosin amine and a water insoluble carboxylic acid soap, the reaction to obtain this product being carried out in the presence of a quinoline. The novel reaction products so obtained have improved fungicidal and insecticidal uses and the reaction products form solutions which are relatively light in color to thereby extend the uses of these products.

In my copending application entitled "Fungicidal Composition," Serial No. 389,159, filed October 29, 1953, I have described and claimed metal rosin ammonium phenoxide complexes reacted with water insoluble carboxylic acid soaps in the presence of a quinoline and I have further described the high fungicidal activity of these products on plants (botanical), textiles, paper, leather, wood, sealers, lacquers, etc. In the treatment of textiles, paper or other sheet material with these novel compounds or in the incorporation of these novel compounds in varnishes, clear lacquers, sealers, or in the use of these new compounds for the treatment of vegetation to combat pest infestation, the presence of undesirable extraneous color in the compositions containing the compound presents a problem which may frequently limit the usefulness of these compositions. The problem was effectively solved in my copending application Serial No. 389,159, particularly in the case where the metal of the rosin ammonium phenoxide complex is reacted with a copper soap by carrying out the reaction in the presence of a quinoline.

I have found that it is possible to entirely omit the use of phenols in the manufacture of the finished product containing the complex metal ammine salt of a rosin amine and the water insoluble carboxylic acid soap by the present invention. Surprisingly, the formulations of the present invention in which the metal rosin ammonium phenoxide complex is substituted by the complex metal ammine salt of a rosin amine provides substantially as effective fungicidal protection as in the compositions wherein the phenoxide complex is present. I have found that the complex metal ammine salt of a rosin amine reacted with a water insoluble carboxylic acid soap in the presence of a quinoline produces an enhanced fungicidal efficacy which is beyond that which can be attributed to the efficacy of the components separately and substantially equivalent to that of the compositions containing these ingredients included with the phenoxide complexing agent interacting with the rosin amine.

Further, the novel reaction products in accordance with the invention, particularly in the case where the insoluble carboxylic acid soap is a soap of copper, are of a light color. The deep blue color which exists in the absence of quinoline and which has caused a dyeing problem particularly where khaki shades are used is obviated in the present products due to the presence of a quinoline in the reaction. It is possible to dye textile and other fabrics to any desired khaki shade readily. The omission of the phenol, above mentioned, in the manufacture of the product of the invention simplifies the manufacturing process.

In general, the novel reaction products of the present invention are prepared by reacting a complex metal ammine salt of a rosin amine with a water insoluble soap of a carboxylic acid in the presence of a quinoline, at an elevated temperature at least sufficient to place the reactants into homogeneous solution. The metal of the complex may be nickel, copper, cobalt, zinc, aluminum, silver, iron, chromium, mercury or other metal whose salt is capable of forming a complex with ammonia as described in Patent No. 2,513,429, granted July 4, 1950. The metal is introduced by reacting a rosin amine with a water soluble salt capable of forming a complex with ammonia. The complex metal ammine salt of a rosin amine may be introduced as such into the reaction with the water insoluble soap or it may be formed in situ in the reaction mix. Examples of these soluble salts are copper acetate, zinc acetate, the acetates of the other named metals, and the formate, chloracetate, bromoacetate, chloride, sulfate, borate, carbonate, thiocyanate, etc., salts capable of forming complexes with ammonia. The quinoline may be any quinoline, substituted or unsubstituted, such as quinoline, isoquinoline, quinaldine, 4-chloroquinoline, 6-nitroquinoline, 7-nitroquinoline, 6-methoxyquinoline, 8-methoxyquinoline, 2-hydroxyquinoline, 4-methyl-2-hydroxyquinoline, 4-hydroxyquinoline, 2-methyl-4-hydroxyquinoline, 5-hydroxyquinoline, 6-hydroxyquinoline, 7-hydroxyquinoline, 8-hydroxyquinoline, etc. The preferred quinolines are isoquinoline and 8-hydroxyquinoline. The reaction may be carried out at a temperature in the order of about 250° to 400° F. Lower temperatures may be used, but at a sacrifice of time. Higher temperatures, up to the lowest decomposition temperature of the reactants, may be used, if desired.

The proportions of the complex metal ammine salt of a rosin amine and of the water insoluble soap reactants may be varied widely, as desired. Thus, stoichiometrical proportions of these reactants or an excess of one with respect to the other may be used. With respect to the quinoline, the proportions thereof may vary widely, from about 1.5% to 14% by weight based on the weight of the complex metal ammine salt of a rosin amine.

The complex metal ammine salt of a rosin amine may be introduced as such into the reaction with the water insoluble soap and the quinoline or it may be formed in situ in the reaction mix. The in situ reaction is preferred. In the in situ reaction the complex metal may be formed in situ, in the presence of a soap-forming carboxylic acid and the soluble metal salt which forms the insoluble soap. In the preferred procedure, the reaction products of the present invention are formed by the reaction of a water insoluble soap, a quinoline, a rosin amine, and a water soluble salt of a metal capable of forming a complex with ammonia.

Examples of the rosin amines which may be used to form the complex metal amine salt of a rosin amine of the present invention include the rosin amines made from wood or gum rosin or various modified wood or gum rosins, such as dehydrogenated (disproportionated) rosin, hydrogenated rosin, or polymerized rosin. The rosin amines may also be the amines derived from the pure rosin acids in which abietyl amine is the amine derived from abietic acid, dehydroabietyl amine is the amine derived from dehydroabietic acid, dihydroabietyl amine is the amine derived from dihydroabietic acid, and tetrahydroabietyl amine is the amine derived from tetrahydroabietic acid. And they may be the secondary tertiary rosin amines in which the hydrogens attached to the nitrogen are replaced by lower alkyl and alkylol groups, such as methyl dehydroabietyl amine, ethyl dehydroabietyl amine, dimethyl dehydroabietyl amine, diethyl dehydroabietyl amine, isopropyl dehydroabietyl amine, butyl dehydroabietyl amine, hydroxymethyl dehydroabietyl amine, hydroxyethyl dehydroabietyl amine, and di (hydroxyethyl) dehydroabietyl amine. Similar secondary and tertiary rosin amines having the nucleus of abietic acid, dihydroabietic acid, tetrahydroabietic acid, and polymerized abietic acid may also be used, as may also the other amines referred to in the aforesaid patent.

The water insoluble soaps of carboxylic acids which are used as reactants in accordance with the present invention are water-insoluble soaps of a metal or a mixture of metals and a soap-forming acid or a mixture of such acids. Thus, the soaps may be soaps of calcium, barium, magnesium, mercury, lead, cadmium, silver, thallium, manganese, cobalt, nickel, chromium, iron, copper, tin, aluminum and the like. The preferred soaps are the copper, zinc, chromium and nickel soaps because the results obtained with these soaps are superior to those obtainable with the other soaps referred to herein.

The soap-forming acids used in forming the aforesaid metal soaps include caproic acid, caprylic acid, capric acid, lauric acid, myristic acid, palmistic acid, stearic acid, oleic acid, linoleic acid, linolenic acid, palmitoleic acid, melissic acid, hydroxystearic acid, ricinoleic acid, and the like, and mixtures thereof. The preferred soap-forming fatty acids or materials are those saturated and unsaturated higher aliphatic acids containing from twelve to eighteen carbon atoms, and rosin. Other soap-forming fatty acids which may be used in forming the metal soaps used in accordance with the present invention are the mixed higher fatty acids derived from animal or vegetable sources such as, for example, sardine and other fish oils, lard, coconut oil, sesame oil, soybean oil, tung oil, corn oil or partially or completely hydrogenated derivatives of such oils, fatty acids derived from carnauba, spermaceti, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like.

The following examples are illustrative of the preferred method which may be used to form the reaction products of the present invention. In the examples the term "parts" refers to parts by weight.

*Example 1*

549 parts of 2-ethylhexoic acid are mixed with 330 parts of dehydroabietyl amine at a temperature of about 300° F. and stirred. Heating and agitation are continued and 11 parts of 8-hydroxyquinoline are added. To form the copper complex, 352 parts of copper acetate are slowly added while stirring. After all of the copper has been added and is completely reacted (clear solution), the temperature of the reaction mixture is slowly raised to 340° F. at which time there is added 55 parts of magnesium hexoate. Heating is continued until a clear solution is obtained and the charge is cooled to a temperature of about 175° F. and 260 parts of xylol are added to provide a copper concentration of about 8%. The resulting composition is liquid at room temperature and the solvent may be adjusted to provide any concentration of the active ingredients as desired.

The reaction product of Example 1 appears to be the compound, cupri-magnesium dehydroabietyl ammine 8-hydroxyquinolinium 2-ethylhexoate.

The composition of Example 1 was tested to determine its fungicidal activity by treating duck samples with a xylol solution containing 5% of the reaction product, as follows:

Samples of 10 oz. specification army duck were cut into 10" x 30" pieces and the pieces were washed in soap suds, rinsed and dried. The dried pieces were passed through the testing solution so that complete penetration was obtained. They were then passed through a wringer to remove the excess solution. Approximately a 50% wet-pickup was obtained. The treated fabric pieces were then dried for 24 hours to obtain complete solvent release. The dried fabric pieces had a light green color.

The treated and dried pieces of duck were leached for 24 hours in running water and buried horizontally in a well composted soil consisting of 50% black loam and 50% pre-rotted manure, one-half inch below the soil surface. The moisture content of the soil was maintained at approximately 30–50%.

After 28 days incubation in the soil bed, the fabric pieces were removed and examined. There was no evidence of degradation found in the treated fabric pieces after burial and they had retained their original "hand" characteristics. A control 10" x 30" sample of the aforesaid army duck containing no treatment was buried at the same time as the treated pieces and under the same conditions. The control was completely destroyed, being in the form of small deteriorated pieces at the conclusion of the 28 day test period.

Prior to impregnating the piece of duck with the solution of Example 1, it and the untreated piece of duck were tested for tensile strengths on a 500 lb. vertical Scott tester. Each had a tensile strength of 296 lbs. After the 28 day burial period the treated duck and the control piece were removed from the soil, washed thoroughly in warm water to remove all soil particles and airdried at room temperature. Tensile strength on the treated piece was then taken on the same Scott tester. It had a tensile strength of 298 lbs. The control piece was removed from the soil in small deteriorated pieces which had lost their fabric strength and hence were not tested. Each of these small pieces was badly stained. In contrast the treated piece was substantially free from stain.

*Example 2*

Example 1 was repeated except that 50 parts of isoquinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 3*

Example 1 was repeated except that 549 parts of dihydroabietyl amine were used in lieu of the dehydroabietyl amine and 60 parts of quinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 4*

Example 1 was repeated except that 66 parts of 8-methoxyquinoline were used in lieu of 8-hydroxyquinoline. A test solution and fabric pieces were made up and tested against an untreated fabric control piece, as described. The treated pieces showed no sign of degradation and no loss of "hand," whereas the control piece had completely deteriorated.

*Example 5*

Example 1 was repeated except that a corresponding amount of nickel 2-ethylhexoate was used in lieu of the soap of Example 1 and 66 parts of 4-chloroquinoline were used in lieu of the 8-hydroxyquinoline. A test solution and fabric pieces were made up and tested against an untreated fabric control piece, as described. The treated pieces showed no sign of degradation and no loss of "hand," whereas the control piece had completely deteriorated.

*Examples 6, 7, 8, 9 and 10*

Example 1 was repeated except that 352 parts of zinc acetate were used in lieu of the copper acetate. Example 1 was repeated except that 352 parts of mercury carbonate were used in lieu of the copper acetate. Example 1 was repeated except that 352 parts of nickel chlorácetate were used in lieu of the copper acetate. Example 1 was repeated except that 352 parts of silver acetate were used in lieu of the copper acetate. Example 1 was repeated except that 352 parts of chromic chloride were used in lieu of the copper acetate. Test solutions of these double salts and fabric pieces treated therewith were made up and tested against an untreated fabric control piece, as described. The treated pieces showed no sign of degradation and no loss of "hand," whereas the control piece had completely deteriorated.

The reaction products of each of Examples 1 to 10, inclusive, in the form of the solutions described, were individually applied to wood samples 1" x 3" and leather squares 2" x 6" by soaking under vacuum for 20 minutes and drying for 6 hours. The treated specimens and untreated control specimens of similar dimensions were placed on a sterile nutrient agar medium with a pH of 5.5, which was used for the substratum in the petri dishes in which the specimens were placed. Each treated speciment and a control specimen were placed in a single petri dish. The specimens in each of these dishes were sprayed with a spore suspension of the following organisms and incubated at 30° C. for 14 days: *Chaetomium globosum, Penicillium citrinum, Aspergillus niger, Aspergillus ferreus, Trichoderma viride,* and *Aspergillus flavus.*

At the conclusion of this test period it was found that fungi were growing over the entire surface of the leather and wood control specimens and that no growth existed on the treated wood and leather specimens.

The reaction products of the present invention can be used to treat textiles, papers, leather and the like by impregnating or coating these materials with a solution or dispersion of the reaction product in a suitable vehicle. Thus, the solutions described above may be used to treat these materials. These solutions may be compounded with resins, animal, vegetable and fish oils, plasticizers, flameproofing agents, driers, antioxidants and the like, in accordance with known techniques, to impart to the solutions desired properties. For example, characteristics such as spread and flow of these solutions may be modified by the addition thereto of a fatty acid such as lauric acid, oleic acid, linseed oil fatty acids, hempseed oil fatty acids and like fatty acids having from 8 to 20 carbon atoms in the chain, and of a fatty acid glyceride, either raw or treated, such as raw or bodied linseed oil, China wood oil, castor oil, dehydrated castor oil, and the like. Compatible natural and snythetic resins such as rosin, phenol-aldehyde resins, urea-aldehyde resins, vinyl resins and the like, or compatible cellulose derivatives such as nitrocellulose, cellulose, cellulose acetate, ethyl cellulose and the like may be incorporated in the solutions in varying proportions to meet any desired needs.

Plasticizers such as glycol, glycerine, pentaerythritol, sorbitol, mannitol and other compatible plasticizers may be added to the solutions. Suitable antioxidants which may be added to the solution are phenyl salicylate, tertiary butyl catechol and guaiacol, and suitable driers are zinc naphthenate, lead naphthenate, cobalt naphthenate and zinc octoate.

If it is desired to impart water-proof properties to the solutions of the reaction products of the present invention, various waxes such as paraffin wax, bees wax, carnauba wax, spermaceti wax, synthetic waxes, and the like, may be incorporated in the solutions in varying proportions to meet the desired needs.

By a proper choice of the solvents for the reaction products of the present invention and of suitable modifying agents, the resulting liquid compositions may be controlled as to consistency, drying time, flow, penetration, and the like.

Other solvents for the reaction products of the present invention are toluol, benzol, carbon tetrachloride, mineral spirits, naphtha, acetone, and the like. Any aliphatic or aromatic solvents, in general, may be used.

Compositions containing reaction products of the present invention not only inhibit the growth of fungus organisms but may also kill the activity of all existing fungus growth on contact. Textiles, leather, wood, resins, etc., which have been treated with the reaction products of the present invention are not attacked to any appreciable extent by soil animal life and these treated materials resist the action of bacteria and insects. The reaction products of the present invention lend themselves for use as insecticides, in either dry or liquid form, and for preventing and combating diseases of plant life, both those diseases which attack the parts of plants above ground and diseases such as rot which attack underground parts of the plants. In dry form the active ingredient is mixed with an inert diluent such as bentonite, kieselguhr, talc, etc.

While the present invention has been described in connection with certain specific examples of methods of making the reaction products, it is obvious that my invention is not to be construed as limited to the specific materials disclosed in these examples or to the details of the methods set forth therein, since changes in materials, proportions and method details may be made without departing from the scope of my invention as defined in the appended claims.

I claim:

1. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and a quinoline selected from the group consisting of quinoline, isoquinoline, a halogen substituted quinoline, a nitroquinoline, an alkoxy quinoline and an alkyl quinoline.

2. The product produced by the method of claim 1.

3. The method of forming a composition of matter comprising heating at an elevated temperature sufficient to place the reactants into homogeneous solution below the lowest decomposition temperature of the reactants, a rosin amine, a water soluble salt of a metal capable of forming a complex with ammonia, a water insoluble carboxylic acid soap and a quinoline selected from the group consisting of quinoline, isoquinoline, a halogen substituted quinoline, a nitroquinoline, an alkoxy quinoline and an alkyl quinoline.

4. The method of forming a composition of matter comprising heating at an elevated temperature sufficient to place the reactants into homogeneous solution below the lowest decomposition temperature of the reactants, dehydroabietyl amine, copper acetate, magnesium 2-ethylhexoate and 8-hydroxyquinoline.

5. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and 8-hydroxyquinoline.

6. The product produced by the method of claim 5.

7. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and isoquinoline.

8. The product produced by the method of claim 7.

9. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and quinoline.

10. The product produced by the method of claim 9.

11. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble caboxylic acid soap and an hydroxyquinoline.

12. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and quinaldine.

13. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a water insoluble carboxylic acid soap and 4-chloroquinoline.

14. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a magnesium carboxylic acid soap and a quinoline selected from the group consisting of quinoline, isoquinoline, a halogen substituted quinoline, a nitroquinoline, an alkoxy quinoline and an alkyl quinoline.

15. The product produced by the method of claim 14.

16. The method of forming a composition of matter comprising heating at an elevated temperature sufficient to place the reactants into homogeneous solution below the lowest decomposition temperature of the reactants, a copper complex metal ammine salt of a rosin amine, a magnesium carboxylic acid soap and 8-hydroxyquinoline.

17. The product produced by the method of claim 16.

18. The method of forming a composition of matter comprising heating at an elevated temperature sufficient to place the reactants into homogeneous solution below the lowest decomposition temperature of the reactants, a chromium complex metal ammine salt of a rosin amine, a magnesium carboxylic acid soap and isoquinoline.

19. The product produced by the method of claim 18.

20. The method of forming a composition of matter comprising heating at an elevated temperature sufficient to place the reactants into homogeneous solution below the lowest decomposition temperature of the reactants, a copper complex metal ammine salt of a rosin amine, a magnesium carboxylic acid soap and quinoline.

21. The product produced by the method of claim 20.

22. The method of forming a composition of matter comprising heating at an elevated temperature sufficient to place the reactants into homogeneous solution below the lowest decomposition temperature of the reactants, a complex metal ammine salt of a rosin amine, said metal of said salt being a metal whose salt is capable of forming a complex with ammonia a magnesium carboxylic acid soap and an hydroxyquinoline.

23. The product produced by the method of claim 4.

24. The method of forming a composition of matter comprising heating at an elevated temperature sufficient to place the reactants into homogeneous solution below the lowest decomposition temperature of the reactants, dehydroabietyl amine, copper acetate, magnesium 2-ethylhexoate and isoquinoline.

References Cited in the file of this patent

UNITED STATES PATENTS

| | | |
|---|---|---|
| 2,490,924 | Schertz | Dec. 13, 1949 |
| 2,490,925 | Schertz | Dec. 13, 1949 |
| 2,492,939 | Schertz | Dec. 27, 1949 |
| 2,513,429 | Rosher | July 4, 1950 |

FOREIGN PATENTS

| | | |
|---|---|---|
| 640,402 | Great Britain | July 19, 1950 |